(12) United States Patent
Chadbourne

(10) Patent No.: US 7,348,489 B2
(45) Date of Patent: Mar. 25, 2008

(54) ELECTRICAL CONNECTOR FOR ALUMINUM CONDUCTOR COMPOSITE CORE (ACCC) CABLE

(75) Inventor: Christopher G. Chadbourne, Nashua, NH (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 11/216,556

(22) Filed: Aug. 31, 2005

(65) Prior Publication Data

US 2006/0084327 A1    Apr. 20, 2006

Related U.S. Application Data

(60) Provisional application No. 60/610,507, filed on Sep. 15, 2004.

(51) Int. Cl.
*H01R 9/05* (2006.01)
(52) U.S. Cl. .................. 174/74 R; 174/84 C
(58) Field of Classification Search ............ 174/74 R, 174/84 C
See application file for complete search history.

(56) References Cited

U.S. PATENT DOCUMENTS

| 7,019,217 B2 * | 3/2006 | Bryant ................ 174/88 R |
| 2001/0040039 A1 * | 11/2001 | DeAngelis ............ 174/74 R |
| 2004/0132366 A1 | 7/2004 | Hiel et al. ............. 442/43 |
| 2005/0129942 A1 | 6/2005 | Hiel et al. ............. 428/375 |

\* cited by examiner

*Primary Examiner*—Chau N. Nguyen
(74) *Attorney, Agent, or Firm*—Harrington & Smith, PC

(57) ABSTRACT

A dead end electrical connector assembly including a dead end connector member, a collet, wedges and an outer sleeve. The dead end connector member has a first end section and a second end section. The second end section includes a threaded section. The first end section is adapted to be connected to another member and includes a general bolt head section adapted to be turned by a powered tool to axially rotate the dead end connector member. The front end of the collet includes a threaded section adapted to be threaded onto the threaded section of the dead end connector member. The wedges are inserted directly between the collet and a core member of a cable conductor. The second end section of the dead end connector member is adapted to push the wedges into the collet. The outer sleeve is crimped onto the dead end connector member and the cable.

20 Claims, 11 Drawing Sheets

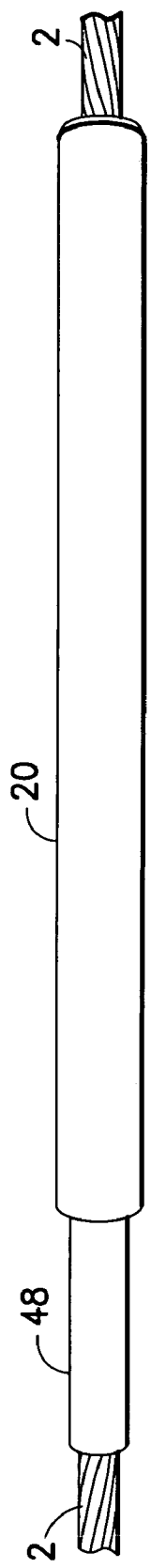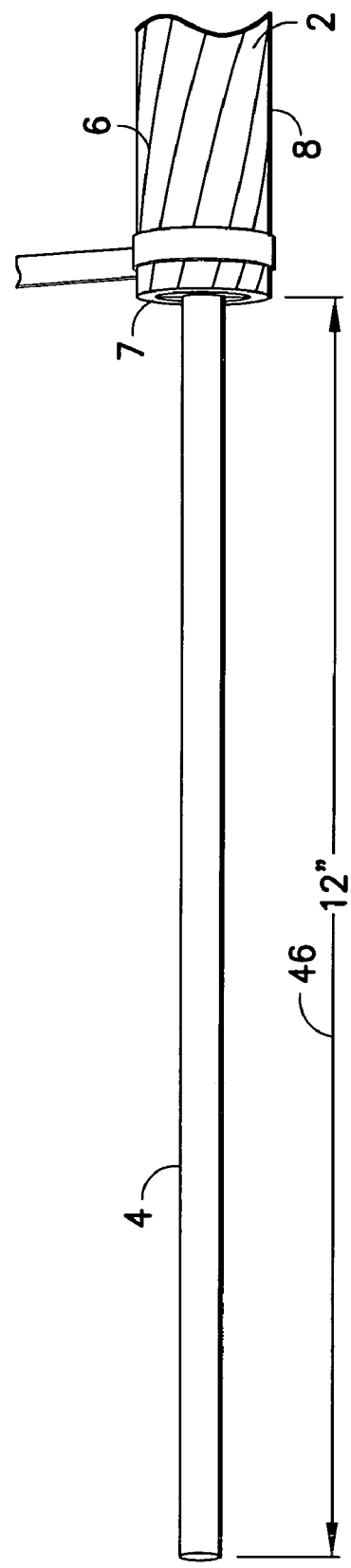

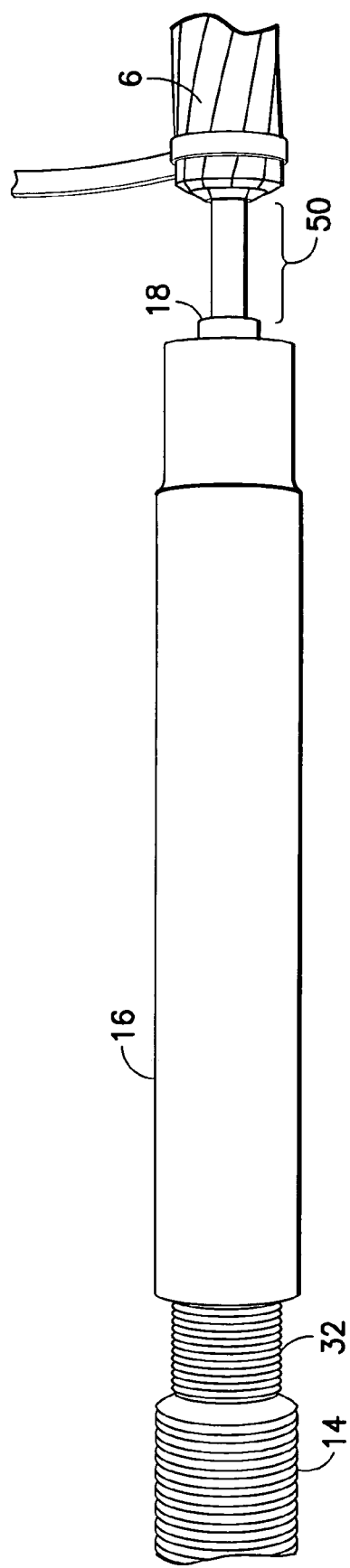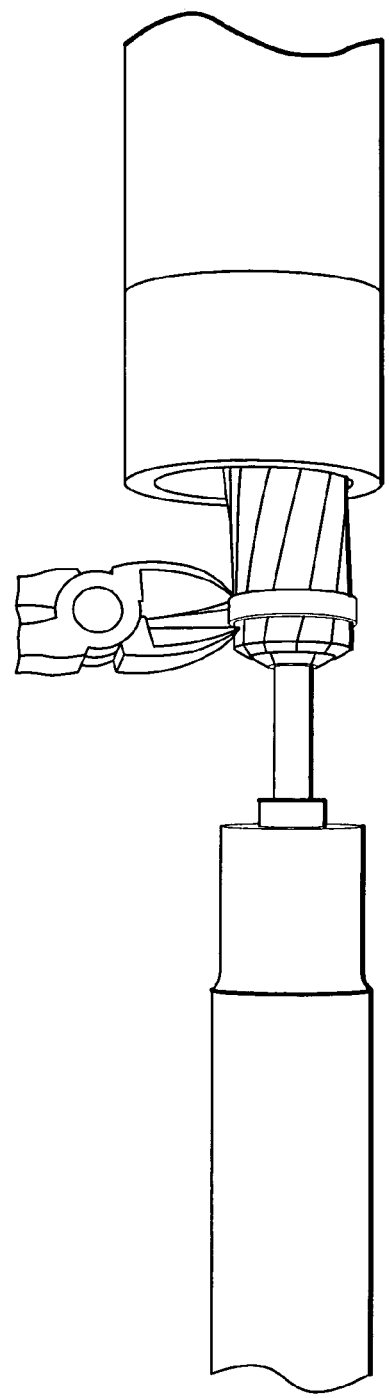

ELECTRICAL CONNECTOR FOR ALUMINUM CONDUCTOR COMPOSITE CORE (ACCC) CABLE

CROSS REFERENCE TO RELATED APPLICATION

This application claims the benefit under 35 U.S.C. §119 (e) of U.S. provisional patent application No. 60/610,507 filed Sep. 15, 2004, which is hereby incorporated by reference.

BACKGROUND OF THE INVENTION

1. Field of the Invention

The invention relates to an electrical connector and, more particularly, to an electrical connector for an aluminum conductor composite core (ACCC) cable.

1. Brief Description of Prior Developments

Aluminum conductor steel reinforced (ACSR) and other traditional energy cables utilize a steel wire core around which aluminum conductor wires are wrapped; a design originally introduced in 1898. Composite Technology Corporation (CTC) of Irvine, Calif. sells a new type of transmission and distribution energy cable; an Aluminum Conductor Composite Core (ACCC) cable. U.S. patent publication Nos. 2004/0132366 A1 and 2005/0129942 A1 describe Aluminum Conductor Composite Core (ACCC) cables. ACCC cables incorporate a light-weight advanced composite core around which aluminum conductor wires are wrapped in a manner similar to traditional energy cables. The composite core replaces the traditional steel wire core. The composite core's lighter-weight, smaller size, and enhanced strength and other performance advantages over traditional steel core allows a ACCC cable to double the current carrying capacity over existing transmission and distribution cables and virtually eliminate high-temperature sag.

There is a need for an electrical connector which can be quickly attached to a cable having a composite core, without crushing or significantly damaging the composite core, and which can provide a good tensile connection between the cable and the connector to allow the cable/connector assembly to be suspended by attachment to transmission towers.

SUMMARY OF THE INVENTION

In accordance with one aspect of the invention, an electrical connector assembly is provided comprising a connector member, a collet, a wedge and an outer sleeve. The connector member has a first end section and a second end section. The first end section comprises a head section adapted to be axially turned by a powered tool to axially rotate the connector member. The collet has a general tube shape. The collet comprises a front end and a rear end. The front end of the collet is fixedly mounted onto the second end section of the connector member. The wedge is located directly between the collet and a core member of a cable conductor. The second end section of the connector member pushes the wedge into the collet as the connector member and the collet are being connected with each other. The outer sleeve is located around the collet. The outer sleeve has a front end which is crimped onto the connector member.

In accordance with another aspect of the invention, a dead end electrical connector assembly is provided including a dead end connector member, a collet, wedges and an outer sleeve. The dead end connector member has a first end section and a second end section. The second end section includes a threaded section. The first end section is adapted to be connected to another member and includes a general bolt head section adapted to be turned by a powered tool to axially rotate the dead end connector member. The front end of the collet includes a threaded section adapted to be threaded onto the threaded section of the dead end connector member. The wedges are inserted directly between the collet and a core member of a cable conductor. The second end section of the dead end connector member is adapted to push the wedges into the collet. The outer sleeve is crimped onto the dead end connector member and the cable.

In accordance with one method of the invention, a method of connecting an electrical connector to an aluminum conductor composite core (ACCC) cable is provided comprising removing conductor wires from an end of the cable to expose a length of a composite core of the cable; locating the exposed composite core inside a collet; inserting wedges between the exposed composite core and the collet; screwing a connector member into the collet, wherein the connector member pushes the wedges into the collet as the collet is screwed with the connector member, and wherein the connector member comprises a general nut shaped end section which is located in a power tool and rotated to axially rotate the connector member and thereby screw the connector member into the collet; and locating an outer sleeve around the collet and crimping the outer sleeve to the connector member and the cable.

BRIEF DESCRIPTION OF THE DRAWINGS

The foregoing aspects and other features of the invention are explained in the following description, taken in connection with the accompanying drawings, wherein:

FIG. 5 is a side view of an outer sleeve and a filler sleeve of the connector of FIG. 2 located onto the cable during assembly;

FIG. 6 is a side view or the cable shown in FIG. 1 with the wire conductors removed from a length at the end of the composite core;

FIG. 13 is a side view of the final installed position of the collet, wedges and dead end connector member to the cable;

FIG. 14 is a side view of the temporary cable tie being removed and the outer sleeve being located to be positioned onto the collet and the dead end connector member;

DETAILED DESCRIPTION OF THE PREFERRED EMBODIMENTS

Figure 1:
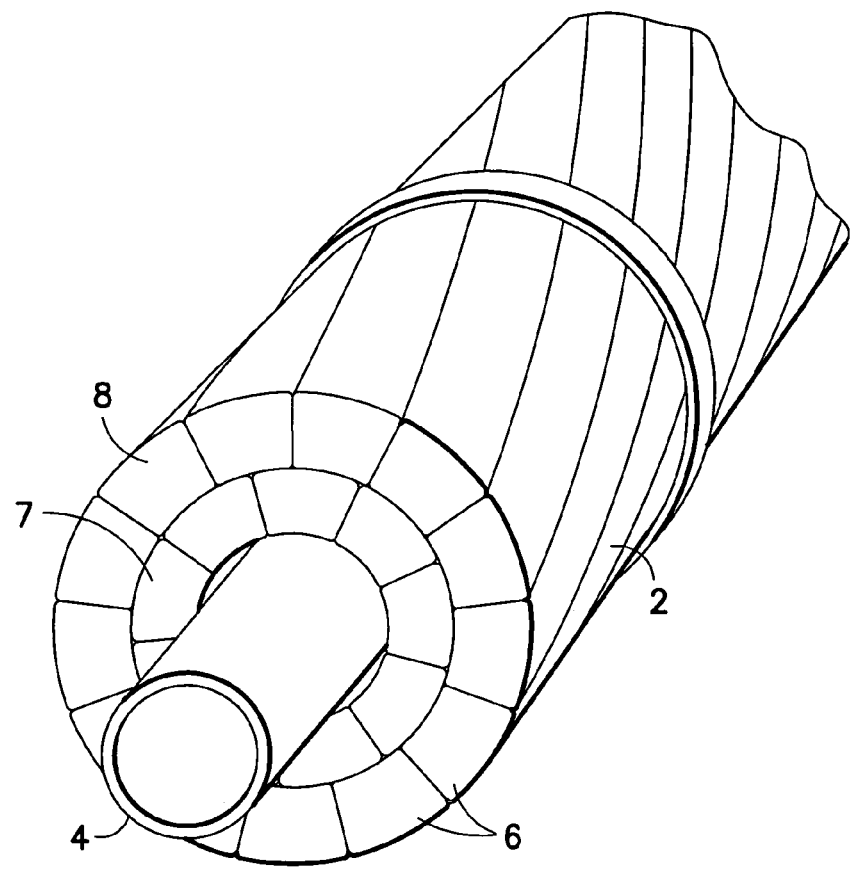
FIG. 1 is a perspective view of an end of an Aluminum Conductor Composite Core (ACCC) cable.

Referring to FIG. 1, there is shown a perspective view of an end of an Aluminum Conductor Composite Core (ACCC) cable 2. The ACCC cable incorporate a light-weight advanced composite core 4, such as a carbon composite, around which conductor wires 6, such as made of aluminum, are wrapped. In the embodiment shown, the wires 6 include inner strands 7 surrounded by outer strands 8. New transmission conductors with composite cores, as apposed to steel cores, are both lighter and have greater current carrying capacity, allowing more power to flow in existing rights-of way.

Figure 2:
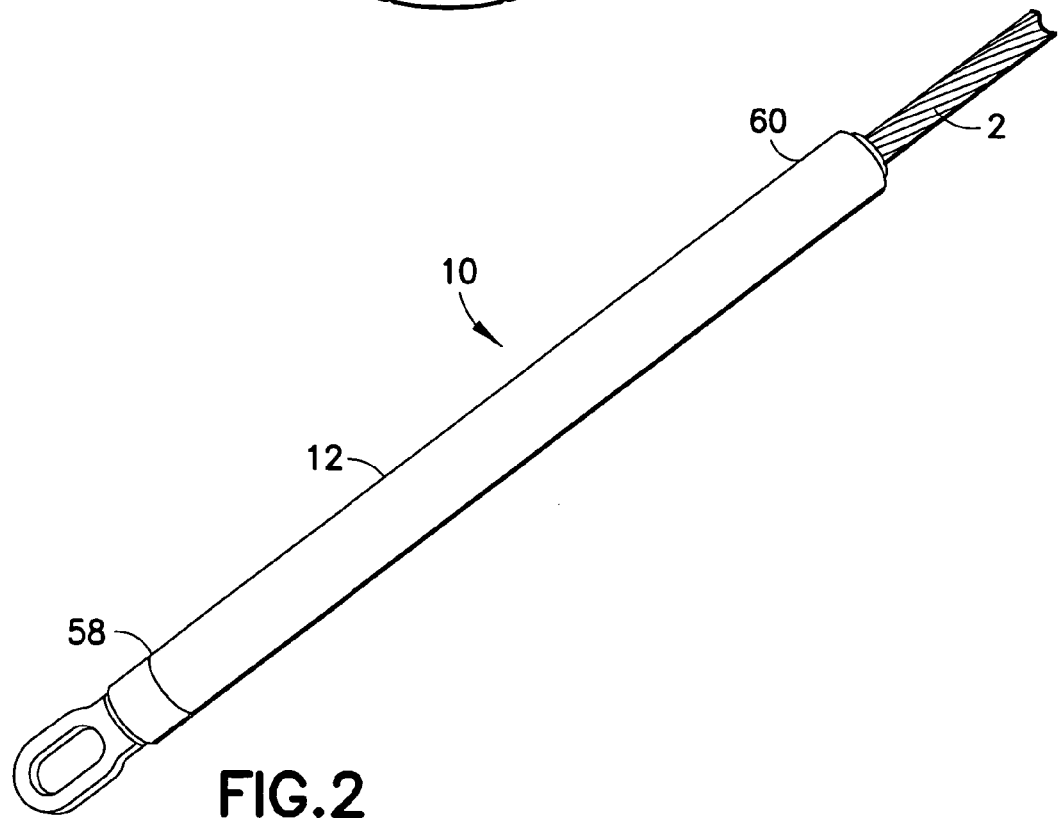
FIG. 2 is a perspective view of a connector and cable assembly.

Referring also to FIG. 2, a cable and connector assembly 10 is shown incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 3:
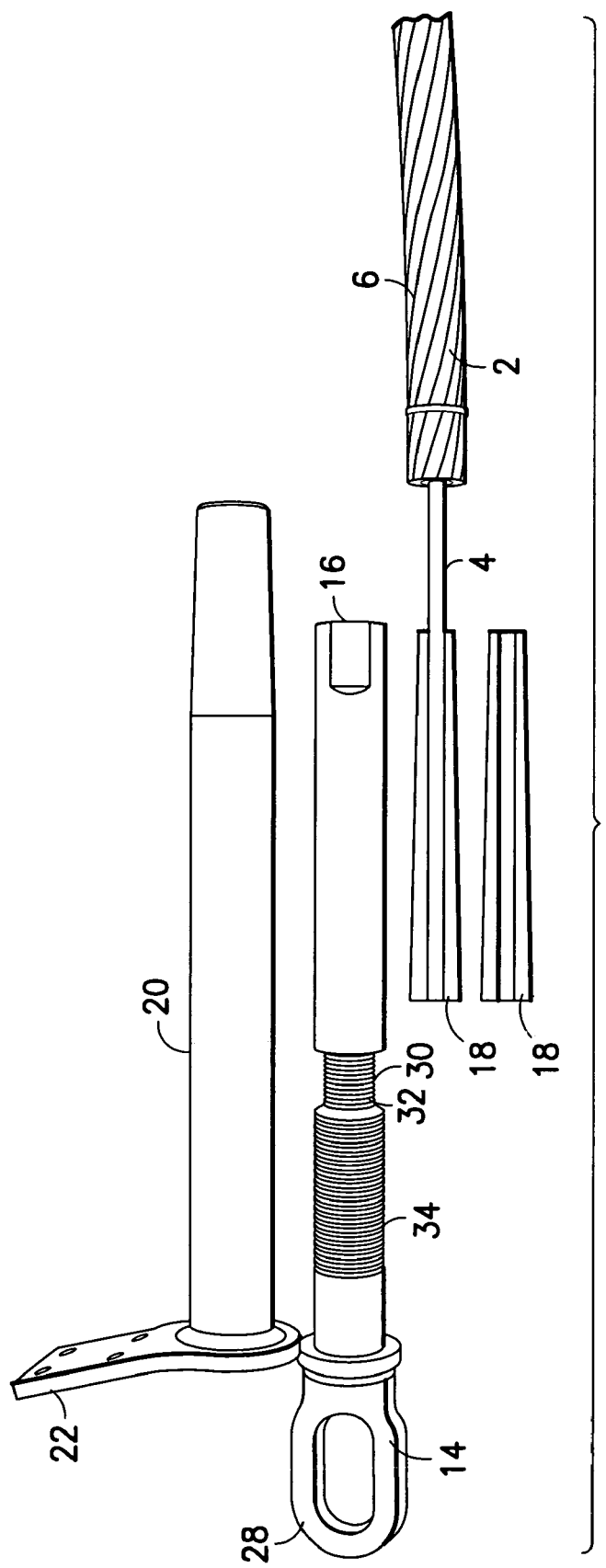
FIG. 3 is an exploded view of the connector and cable assembly shown in FIG. 2.
Figure 4:
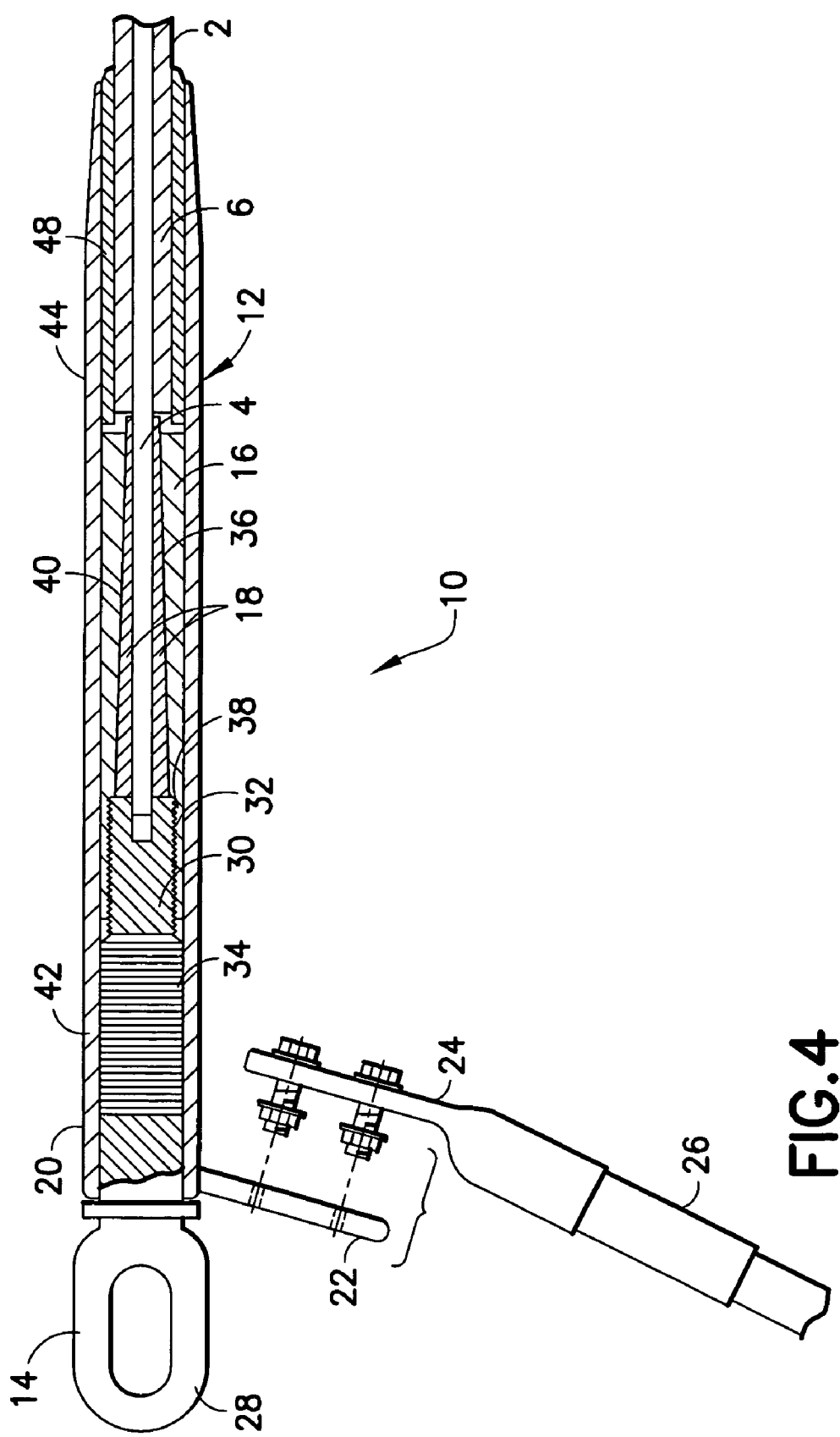
FIG. 4 is a cross sectional view of the connector and cable assembly shown in FIG. 2.

The assembly 10 includes the cable 2 and an electrical connector 12. In this embodiment the connector 12 is a dead end connector adapted to mechanically connect the end of the cable 2 to another member, such as a transmission tower. In alternate embodiments, the connector could comprise any suitably connector function, such as a splice connector for example. Referring also to FIGS. 3 and 4, the connector 12 generally comprises a dead end connector member 14, a collet 16, wedges 18 and an outer sleeve 20. In the embodiment shown in FIGS. 3 and 4 the outer sleeve 20 comprises an integral tap or connection plate 22 for electrically connecting a connector 24 of another cable assembly 26 to the assembly 10. However, as seen in FIG. 2, the connection plate 22 need not be provided.

The dead end connector member 14 comprises a one-piece metal member, such as steel or aluminum, having an eyelet 28 at a first end section and an opposite second end section 30 with a threaded section 32. The dead end connector member 14 also comprises a ridge section 34. The eyelet 28 is adapted to be connected to another member, such as a transmission tower. The collet 16 is preferably a one piece metal member, such as a steel conduit. The collet 16 has a general tube shape with an inner channel 36 having a threaded section 38 at a first end and a tapered section 40 extending away from the threaded section 38.

The wedges 18 comprise two wedges each having a general C shaped cross-section. However, in alternate embodiments, more than two wedges could be provided. The outer sides of the wedges are smooth to be able to slide against the inside surface of the tapered section 40. The inner sides of the wedges are adapted to grip onto the exterior surface of the core 4 of the cable 2. The wedges 18 are adapted to contact each other when fully inserted into the collet 16 to prevent crushing of the composite core 4. The wedges 18 have a suitable length, such as about 11 inches in one example, to provide a large contact area with the composite core 4 to provide a good friction grip which will not come loose at high tensile force, such as about 21 tons.

The outer sleeve 20 is made of electrically conductive metal, such as aluminum. The outer sleeve 20 has a general tube shape. The outer sleeve 20 is located around the collet 16. A first end 42 of the outer sleeve 20 is located over the ridge section 34 of the dead end connector member 14 and crimped or compressed onto the ridge section 34 to form an electrical and mechanical connection between the outer sleeve 20 and the dead end connector member 14. A second end 44 of the outer sleeve 20 is located over the wires 6 of the cable 2 and crimped or compressed onto the wires 6 to form a mechanical and electrical connection with the wires 6. Preferably, the force used to crimp the outer sleeve 20 to the wires 6 is less than 3000 psi to prevent damage to the composite core 4. In the embodiment shown in FIG. 4, the assembly includes a filler sleeve 48 between the outer sleeve 20 and the cable 2. However, in an alternate embodiment the filler sleeve might not be provided.

Figure 7:
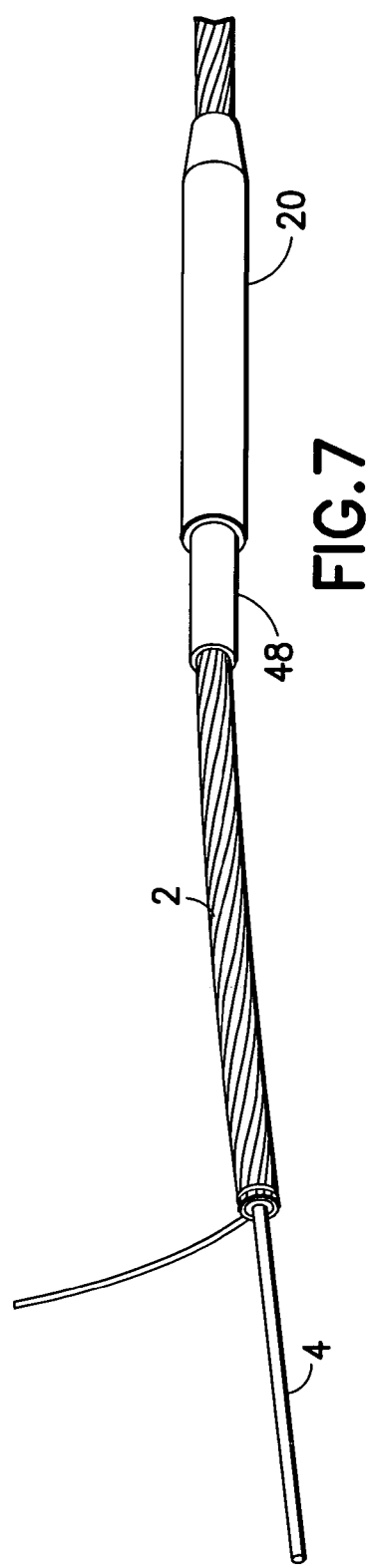
FIG. 7 is a perspective view of the cable as shown in FIG. 6 and showing the outer sleeve and filler sleeve of FIG. 5.

Referring now also to FIGS. 5-14, one method of attaching the connector 12 to the ACCC cable 2 will be described. As seen in FIG. 5, the filler sleeve 48 is installed or slid over the ACCC cable. The outer sleeve 20 is then a slid over the filler sleeve 48. As seen in FIG. 6, the inner and outer strands 7, 8 of the wires 6 are cut to expose a length 46 of the composite core 4. In the embodiment shown, the length 46 is about 12 inches. The outer strands 8 can best be cut with a pipe cutter. The installer can install a cable tie to keep the strands together. The inner strands 7 can be cut with a hacksaw, cutting through a third of the strands and then bending the strands back-and-forth to break them off. In this fashion, the composite core 4 is not damaged in any way. FIG. 7 shows the cable and sleeves ready for installation with the rest of the assembly.

Figure 8:
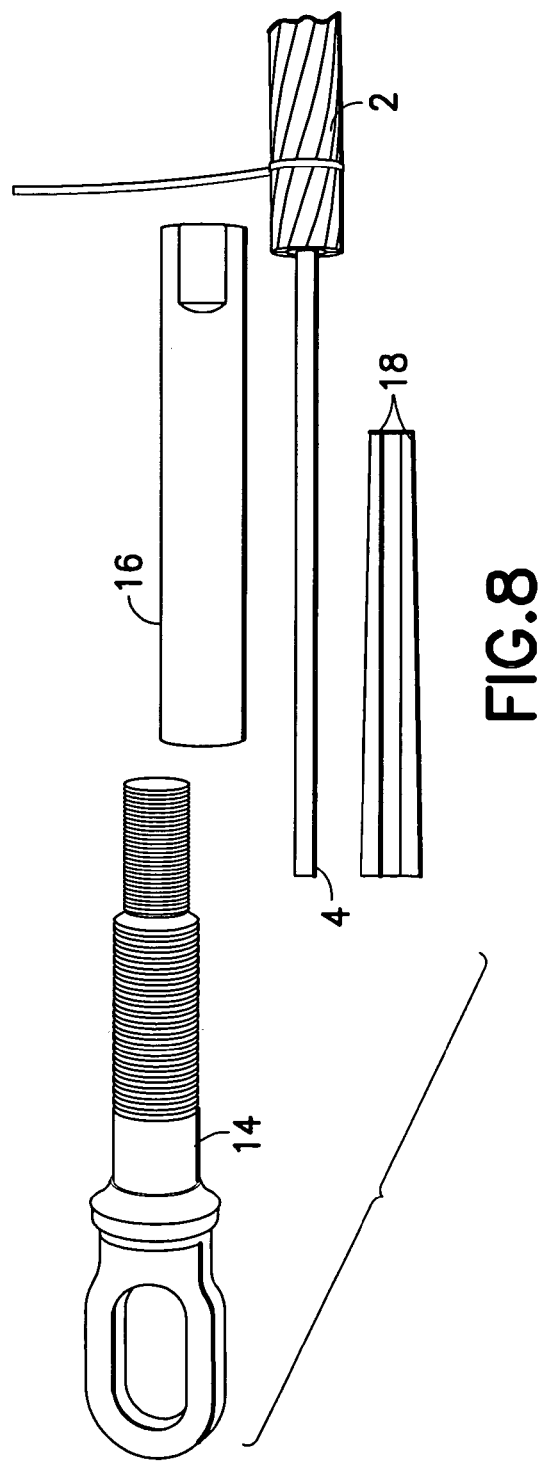
FIG. 8 is a preassembly view of the members shown in FIG. 7 and the other members of the connector shown in FIGS. 3 and 4.
Figure 9:
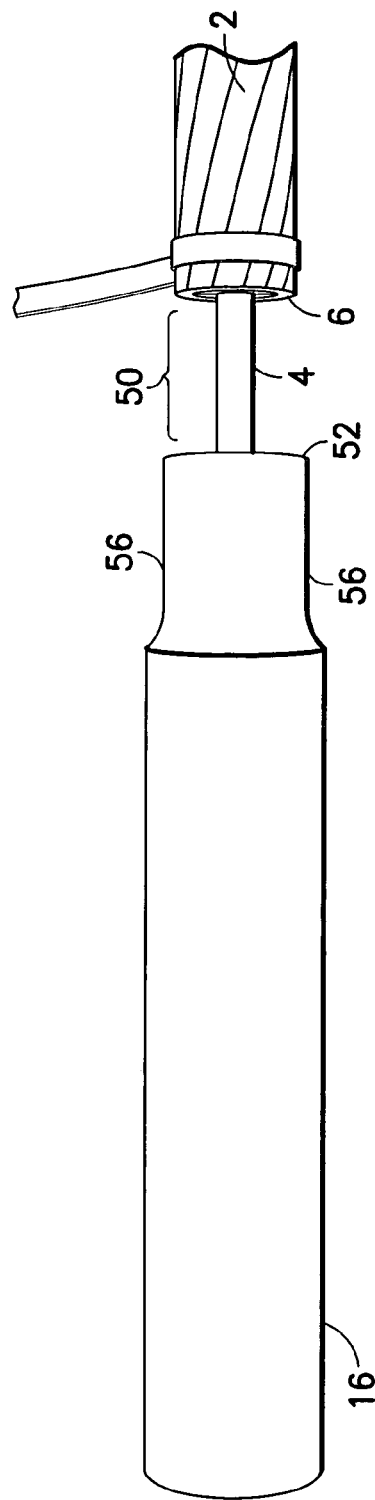
FIG. 9 is a side view showing the collet and wedges initially mounted onto the composite core of the cable.
Figure 10:
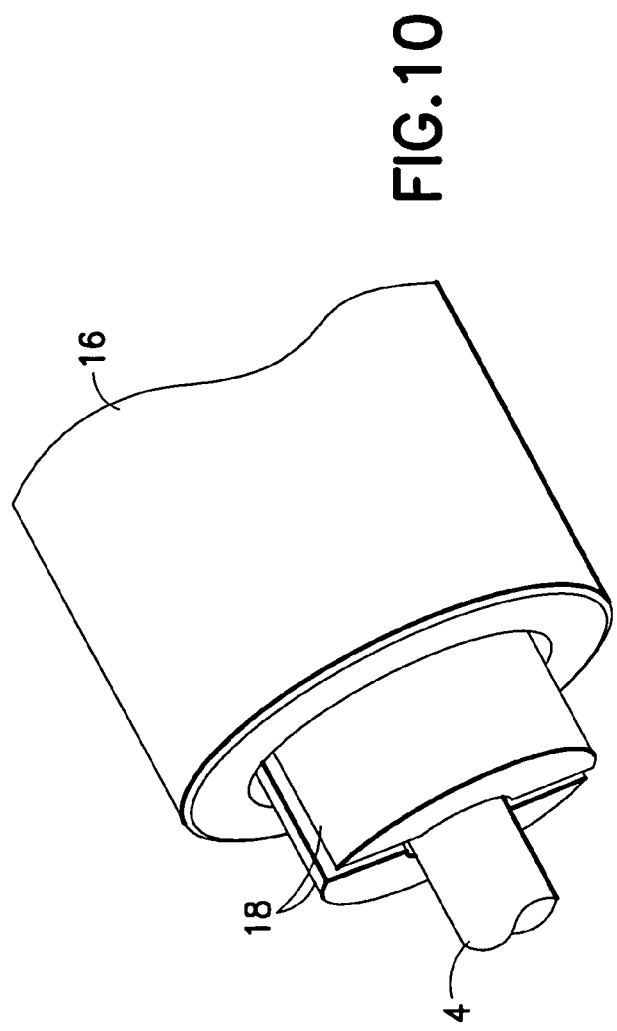
FIG. 10 is a perspective view of an end of the collet, wedges and core shown in FIG. 9.

FIG. 8 shows the connector member 14, wedges 18, and collet 16 ready for installation onto the exposed composite core 4. As seen in FIGS. 9 and 10, the collet 16 is located over the exposed end of the composite core 4 and the wedges 18 are inserted into the collet 16 with the exposed composite core 4 being located between the wedges 18. In the preferred method, a gap 50 is provided between the rear end 52 of the collet 16 and the front end of the wires 6. When the wedges 18 are inserted between the collet 16 and the composite core 4, a small portion of the core 4 extends past the front end of the wedges, such as about ¼ inch.

Figure 11:
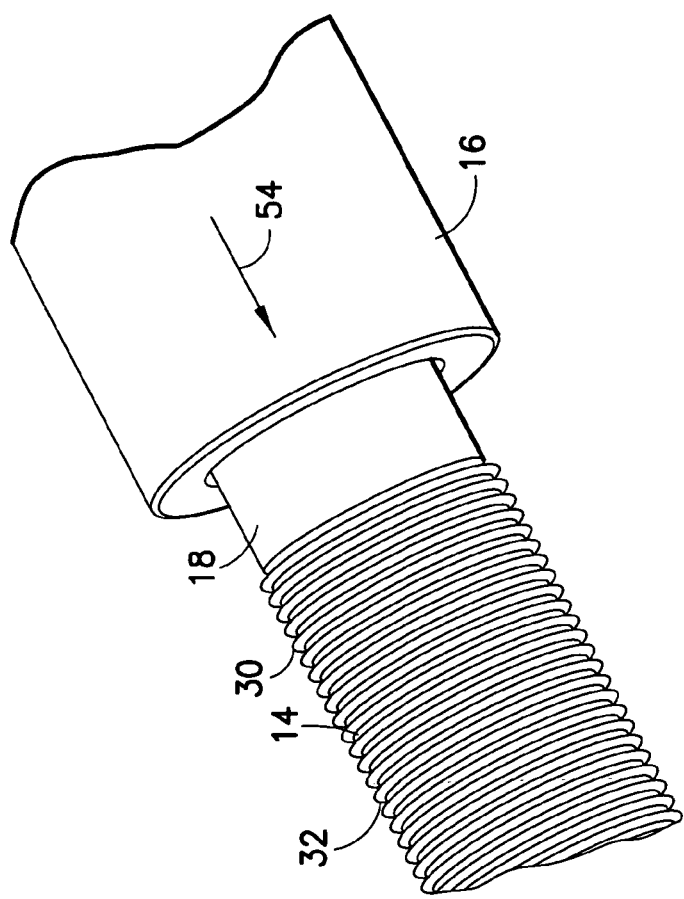
FIG. 11 is a perspective view of the dead end connector member being located against the ends of the wedges shown in FIG. 10.
Figure 12:
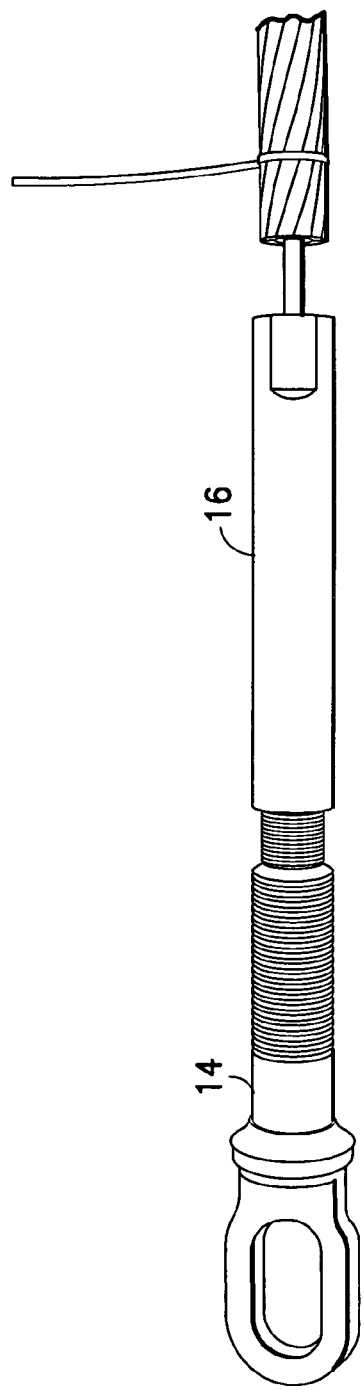
FIG. 12 is a perspective view of the dead end connector member being screwed into the collet shown in FIG. 11.

As seen in FIG. 11, the dead end connector member 14 is positioned on the end of the exposed composite core 4 with the second end 30 located against the front end of the wedges 18. The collet 16 is then pulled or slid towards the dead end connector member 14 as illustrated by a arrow 54. This helps to push the wedges 18 inside the collet 16 and readies the assembly for threading of the collet 16 to the threaded section 32 of the dead end connector member 14. As seen in FIG. 12, the dead end connector member 14 can be screwed together with the collets 16. A tool can be placed inside the eyelet 28 and a wrench can be attached to the flat sections 56 (see FIG. 9) of the collet to rotate the two members 14, 16 relative to each other. This tightens the dead end connector member 14 to the collet 16 to set the wedges 18. In a preferred embodiment, the dead end connector member will bottom out at a predetermined distance of the threaded section 32, such as about 1 inch.

As seen in FIG. 13, with the collet 16 threaded onto the dead end connector member 14, the wedges 18 extend slightly past the rear end of the collet 16. The gap 50 provides a space for the ends of the wedges 18 to move into without encountering interference from the wires 6. The gap 50 also provides a space for aluminum sleeve compression/ expansion of the wires 6 during crimping of the outer sleeve 20 and filler sleeve 48 to the wires. Referring to FIG. 14, the cable tie can be cut away from the wires 6. The outer sleeve 20 and filler sleeve 48 can be slid forward with the outer sleeve 20 stopping against a butt stop on the dead end connector member 14. Referring also to FIG. 2, the front end 58 of the outer sleeve 20 can be crimped onto the dead end connector member 14. The rear end 60 of the outer sleeve 20 can be crimped with the filler sleeve 48 onto the wires 6 of the cable 2. This completes assembly of the electrical connector 12 with the cable 2. The outer sleeve 20 provides an electrical connection of the wires 6 to another member. The connector member 14, collet 16 and wedges 18 provide a mechanical connection of the composite core 4 to another member.

Figure 15:
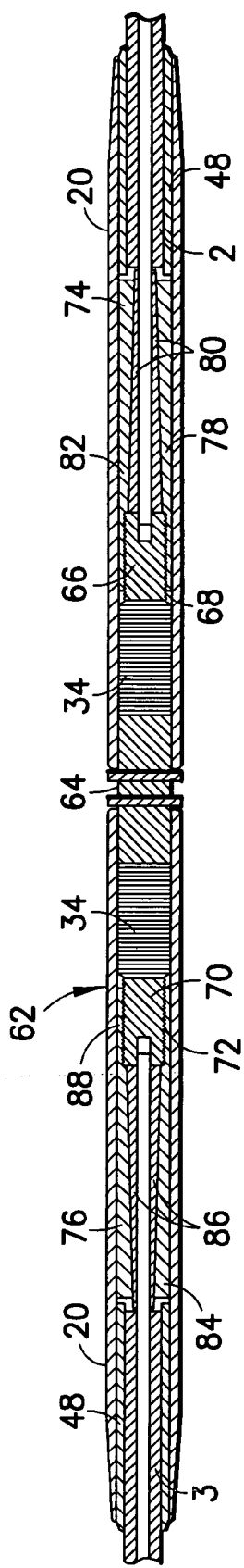
FIG. 15 is a cross sectional view of an electrical splice connector incorporating features of the invention.

Referring now to FIG. 15, a cross sectional view of a splice electrical connector 62 for connecting two of the ACCC cables 2, 3 to each other is shown. The electrical connector 62 generally comprises a middle connector member 64 having a first end 66 with a first threaded section 68 and an opposite second end 70 with a second threaded section 72. The electrical connector 62 also comprises a first section 74 and a second section 76.

The first section 74 generally comprises a first collet 78 and a first set of wedges 80. The first collet 78 has a general tube shape. The first collet 78 comprises a first end 82 with a threaded section adapted to be threaded onto the first threaded section 68 of the middle connector member 64. The first wedges 80 are adapted to be inserted directly between the first collet 78 and a core member of a first cable conductor 2. The first end 66 of the middle connector member 64 is adapted to push the first wedges 80 into the first collet 78 as the middle connector member and the first collet are threaded with each other.

The second section 76 generally comprises a second collet 84 and a second set of wedges 86. The second collet 84 has a general tube shape. The second collet 84 comprises a first end 88 with a threaded section adapted to be threaded onto the second threaded section 72 of the middle connector member 64. The second wedges 86 are adapted to be inserted directly between the second collet 84 and a core member of a second cable conductor 3. The second end 70 of the middle connector member is adapted to push the second wedges 86 into the second collet 84 as the middle connector member and the second collet are threaded with each other. In this embodiment, the second collet 84 and the second set of wedges 86 are identical to the first collet 78 and the first set of wedges 80. However, in alternate embodiments they could be different.

In the embodiment shown in FIG. 15, each section 74, 76 also comprises a filler sleeve 48. The splice connector also comprises two outer sleeves 20; one at each of the sections 74, 76. Assembly of the slice connector 62 with the two cables 2, 3 is the same as noted above with reference to the dead end connector. The outer sleeves 20 are crimped onto the ridge sections 34 of the middle connector member 64, and crimped onto the wires of the cables at the filler sleeves 48. Thus, the two cables are mechanically connected to each other for high tension by the members 64, 78, 80, 84 and 86, and electrically connected to each other by the outer sleeves 20, filler sleeves 48 and middle member 64 which could be aluminum. In an alternate embodiment, a single outer sleeve could be provided for both sections 74, 76.

Figure 16:
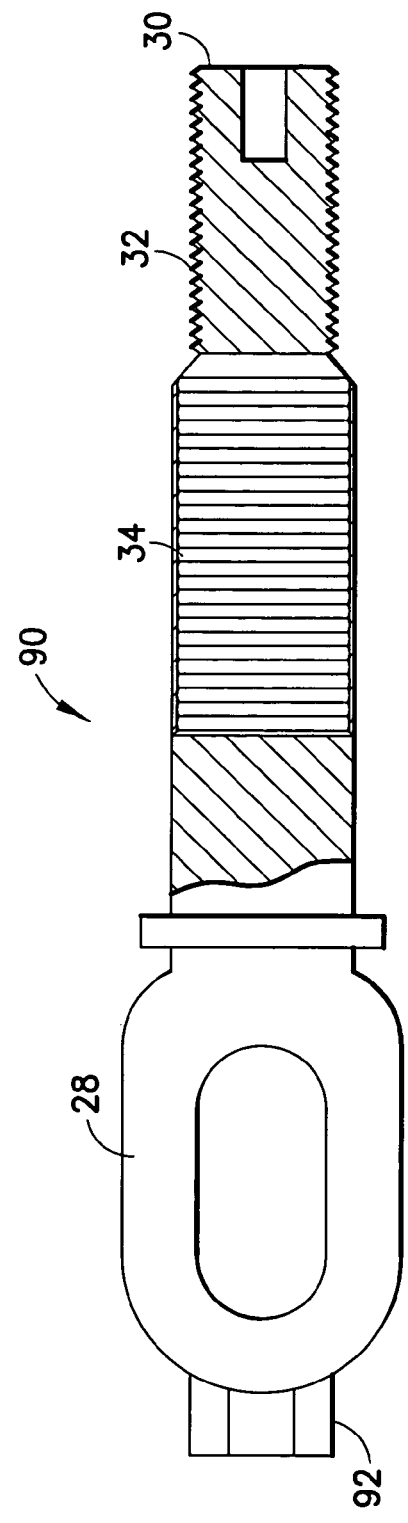
FIG. 16 is a side view with a cut away section of an alternate embodiment of the dead end connector.
Figure 17:
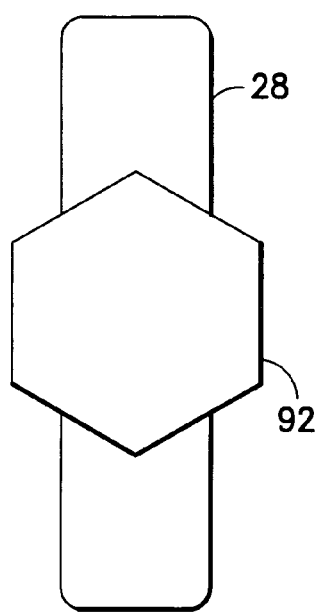
FIG. 17 is an end view of the dead end connector shown in FIG. 16.

Referring now also to FIGS. 16 and 17, an alternate embodiment of the dead end connector is shown. The dead end connector 90 is substantially the same as the dead end connector 14. The dead end connector 90 comprises a one-piece metal member, such as steel or aluminum, having an eyelet 28 at a first end section and an opposite second end section 30 with a threaded section 32. The dead end connector 90 also comprises a ridge section 34. The eyelet 28 is adapted to be connected to another member, such as a transmission tower. The dead end connector 90 also comprises a general bolt head section or general nut shaped end section 92. The bolt head section 92 is adapted to be turned by a powered tool to axially rotate the dead end connector 90. For example, the powered tool could comprise an impact, hydraulic or pneumatic wrench. Alternatively, the bolt head section 92 could be rotated by a non-powered tool, such as a ratchet wrench. In other embodiments the bolt head section 92 could have a general Allen wrench shape, or Phillips screw driver shape, or slotted screw driver shape, or any other suitable type of shape for relatively quick axial rotation of the dead end connector by a tool.

The bolt head section 92 can be attached to the rest of the dead end connector 90, such as by welding or brazing, or can be formed with the dead end connector as a single member, such as being cast or forged in a single mold. The bolt head section 92 is located at the end of the eyelet 28 for relatively easy connection of the tool to the connector 90 and relatively easy axial rotation of the connector 90 by the tool, such that the connector 90 can be quickly screwed into the collet 16 (see FIGS. 3, 4 and 8). In this embodiment the exterior of the bolt head section has six flat sides for relatively easy attachment of a mating socket or an adjustable wrench. However, any suitable exterior shape for mating attachment to a socket to allow for joint axial rotation could be provided.

With use of a power wrench and mating socket, the connector 90 can be more quickly axially rotated than by hand with a manual hand tool. In addition, the torque of the power tool can result in faster screwing of the connector 90 into the collet 16 and pushing of the wedges 18 into the collet. Resistance of the wedges 18 to be pushed into the collet might otherwise slow down insertion of the wedges into their final position if only a manual hand tool is used to screw the connector into the collet. Thus, with the invention and a suitable power tool, the connector 90 can be screwed into the collet faster than with a non-powered screwing of the connector into the collet. The head 92 allows for the attachment of the connector to a standard type of power tool as described about without any specially designed connector head for the power tool. The power tool can use a convention socket in its working head.

Figure 18:
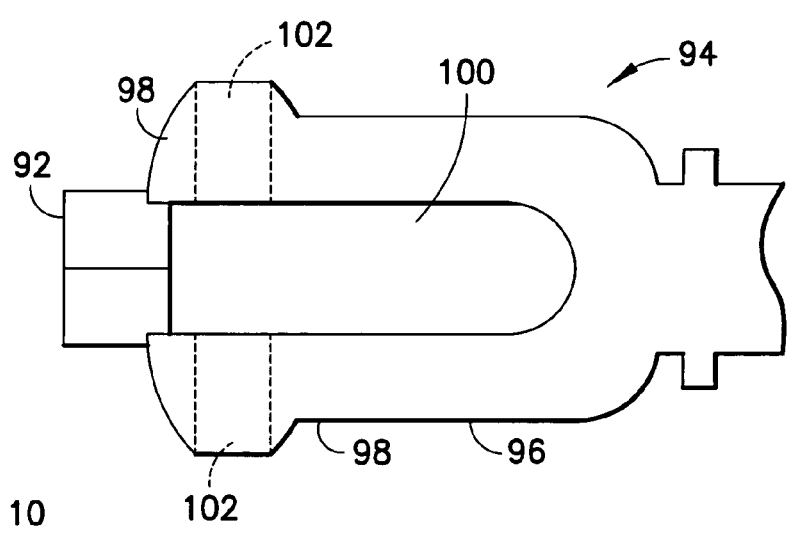
FIG. 18 is a partial side view of another alternate embodiment of the dead end connector.

Referring now also to FIG. 18, another alternate embodiment of the dead end connector is shown. In this embodiment the dead end connector 94 has a clevis section 96 rather than the eyelet section 28 shown in FIG. 16. The clevis section 96 has two arms 98 separated by a slot 100. The ends of the arms 98 have holes 102 for removably receiving a connector pin or bolt (not shown). The dead end connector 94 also comprises a general bolt head section or general nut shaped end section 92. The bolt head section 92 is adapted to be turned by a powered tool to axially rotate the dead end connector 94. For example, the powered tool could comprise an impact, hydraulic or pneumatic wrench. Alternatively, the bolt head section 92 could be rotated by a non-powered tool, such as a ratchet wrench. In other embodiments the bolt head section 92 could be adapted to have a general Allen wrench shape, or Phillips screw driver shape, or slotted screw driver shape, or any other suitable-type of shape for relatively quick axial rotation of the dead end connector by a tool. Attachments to power tools having an Allen wrench shapes, Phillips screw driver shapes, and slotted screw driver shapes are convention in the power tool technologies. In an alternate embodiment the head section 92 might not be provided. Instead, a power tool working head attachment could be used with a power tool which is specially designed to mate with the eyelet section 28 of the connector for allowing joint axial rotation of the attachment with the eyelet 28 by the power tool.

The bolt head section 92 can be attached to the rest of the dead end connector 94, such as by welding or brazing, or can be formed with the dead end connector as a single member, such as being cast or forged in a single mold. The bolt head section 92 is located at the end of the clevis section 96 for relatively easy connection of the tool to the connector 94 and relatively easy axial rotation of the connector 94 by the tool.

Figure 19:
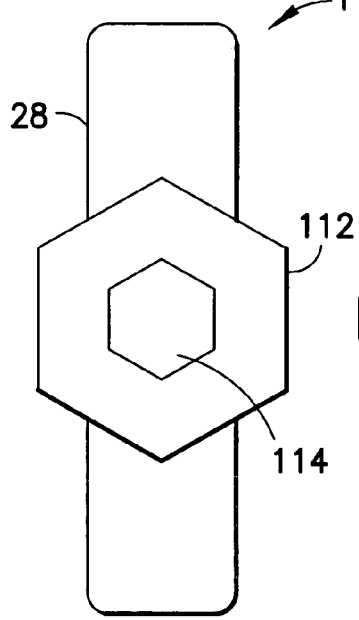
FIG. 19 is an end view of an alternate embodiment of the dead end connector.

Referring now also to FIG. 19, another alternate embodiment of the invention is shown. In this embodiment the dead end connector 110 is substantially the same as the dead end connector 90. The dead end connector 110 comprises a one-piece metal member, such as steel or aluminum, having an eyelet 28 at a first end section and an opposite second end section with a threaded section. The dead end connector 110 also comprises a ridge section. The eyelet 28 is adapted to be connected to another member, such as a transmission tower. The dead end connector 110 also comprises a general bolt head section or general nut shaped end section 112. The bolt head section 112 is adapted to be turned by a powered tool to axially rotate the dead end connector 110. For example, the powered tool could comprise an impact, hydraulic or pneumatic wrench.

Figure 20:
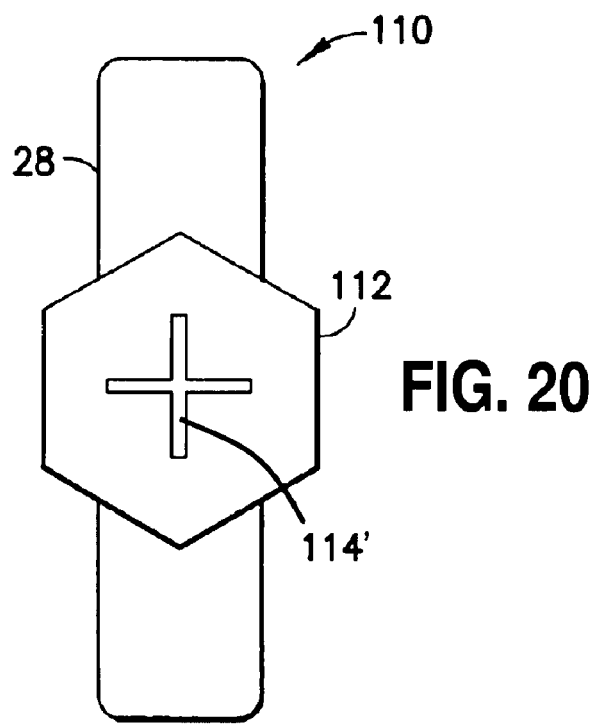
FIG. 20 is an end view of another alternate embodiment of the dead end connector.
Figure 21:
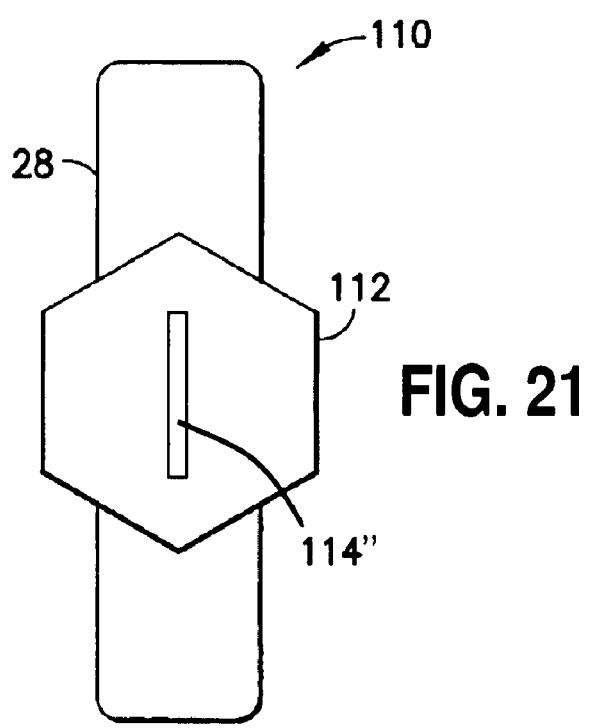
FIG. 21 is an end view of another alternate embodiment of the dead end connector.

In this embodiment, the bolt head section 112 also comprises a hole 114. The hole 114 is adapted to receive a tool, such as an Allen wrench. In another embodiment for example, hole 114' (shown in FIG. 20) may be adapted to receive a Phillips screw driver. In yet another embodiment for example, hole 114" (shown in FIG. 21) may be adapted to receive a slotted screw driver. Thus, the hole is keyed to have a tool inserted into the hole and axially rotated to axially rotate the dead end connector 110. In an alternate embodiment, the hole 114 could be located inside the frame of the eyelet 28 without having the bolt head section 112.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electrical connector assembly comprising:
    a connector member having a first end section and a second end section, wherein the first end section comprises a head section and a clevis, wherein the head section is at an end of the clevis, and wherein the head section is configured to be axially turned by a powered tool;
    a collet having a general tube shape, wherein the collet comprises a front end and a rear end, wherein the front end of the collet is fixedly mounted onto the second end section of the connector member;
    a wedge located between the collet and a core member of a cable conductor, wherein the second end section of the connector member pushes the wedge into the collet as the connector member and the collet are being connected with each other; and
    an outer sleeve located around the collet, wherein the outer sleeve has a front end which is attached onto the connector member.

2. An electrical connector assembly as in claim 1 wherein the head section comprises a bolt head section having an exterior bolt head shape.

3. An electrical connector assembly as in claim 2 wherein the clevis comprises two arm sections with the bolt head section at an end of the two arm sections.

4. An electrical connector assembly as in claim 2 wherein the bolt head section comprises a six sided profile.

5. An electrical connector assembly as in claim 2 wherein the bolt head section comprises a center hole having an Allen wrench receiving shape.

6. An electrical connector assembly as in claim 1 wherein the clevis comprises two arm sections separated by a slot.

7. An electrical connector assembly as in claim 6 wherein the head section is at an end of the slot.

8. An electrical connector assembly as in claim 6 wherein at least one of the arm sections comprises an opening configured to receive a fastener.

9. An electrical connector assembly as in claim 1 wherein the head section comprises a center hole having an Allen wrench receiving shape.

10. An electric connector assembly as in claim 1 wherein the head section comprises a hole having a Phillips screw driver shape, or a slotted screw driver shape.

11. A dead end electrical connector assembly comprising:
    a dead end connector member having a first end section and a second end section, wherein the second end section comprises a threaded section, and wherein the first end section is adapted to be connected to another member, wherein the first end section comprises a general bolt head section and a clevis, wherein the general bolt head section is at an end of the clevis, and wherein the general bolt head section is adapted to be turned by a powered tool to axially rotate the dead end connector member;
    a collet having a general tube shape, wherein the collet comprises a front end and a rear end, wherein the front end of the collet comprises a threaded section adapted to be threaded onto the threaded section of the dead end connector member;
    wedges adapted to be inserted directly between the collet and a core member of a cable conductor, wherein the second end section of the dead end connector member is adapted to push the wedges into the collet as the dead end connector member and collet are threaded with each other; and
    an outer sleeve located around the collet, wherein the outer sleeve has a front end which is crimped onto the dead end connector member and a rear end which is crimped onto the cable.

12. An electrical connector assembly as in claim 11 wherein the general bolt head section comprises an exterior bolt head shape.

13. An electrical connector assembly as in claim 12 wherein the clevis comprises two arm sections with the general bolt head section at an end of the two arm sections.

14. An electrical connector assembly as in claim 12 wherein the general bolt head section comprises a six sided profile.

15. An electrical connector assembly as in claim 12 wherein the general bolt head section comprises a center hole having an Allen wrench receiving shape.

16. An electrical connector assembly as in claim 11 wherein the clevis comprises two arm sections separated by a slot.

17. An electrical connector assembly as in claim 11 wherein the general bolt head section comprises a center hole having an Allen wrench receiving shape.

18. An electrical connector assembly as in claim 11 wherein the general bolt head section is at an end of the slot.

19. An electrical connector assembly as in claim 11 wherein each of the arm sections comprises an opening configured to receive a fastener.

20. An electrical connector assembly as in claim 19 wherein the openings are aligned with each other.

* * * * *